United States Patent [19]

Lustgarten

[11] 4,201,176
[45] May 6, 1980

[54] RADIAL BEARING FOR AN INTERNAL COMBUSTION ENGINE

[75] Inventor: George Lustgarten, Zurich, Switzerland

[73] Assignee: Sulzer Brothers Limited, Winterthur, Switzerland

[21] Appl. No.: 865,515

[22] Filed: Dec. 29, 1977

[30] Foreign Application Priority Data

Jan. 4, 1977 [CH] Switzerland ................ 45/77

[51] Int. Cl.² .............................................. F01M 1/04
[52] U.S. Cl. ............................. 123/196 M; 308/122; 308/123; 308/240; 184/6.5
[58] Field of Search ............ 308/122, 9, 5, 123, 308/240; 123/196 M; 184/6.5

[56] References Cited

U.S. PATENT DOCUMENTS

| | | | |
|---|---|---|---|
| 1,744,048 | 1/1930 | Knight | 308/122 |
| 2,131,170 | 9/1938 | Evans | 308/122 |
| 2,149,097 | 2/1939 | Paton | 184/6.5 |
| 2,199,699 | 5/1940 | Frelin | 184/6.5 |
| 2,940,802 | 6/1966 | Love | 308/240 |
| 2,940,802 | 1/1960 | Love | 308/122 |
| 3,017,229 | 1/1962 | Dilworth | 308/122 |

FOREIGN PATENT DOCUMENTS

| | | | |
|---|---|---|---|
| 864641 | 7/1949 | Fed. Rep. of Germany | 308/122 |
| 923229 | 2/1955 | Fed. Rep. of Germany | |
| 1526556 | 12/1969 | Fed. Rep. of Germany | |
| 517249 | 2/1977 | Switzerland | |
| 889194 | 2/1962 | United Kingdom | 308/9 |
| 1024060 | 3/1966 | United Kingdom | |

OTHER PUBLICATIONS

Friedrich Sass, "Bau und Betrieb von Dieselmaschinen" 1. vol., Second Issue, p. 272, Illustration 285.

*Primary Examiner*—Ronald H. Lazarus
*Attorney, Agent, or Firm*—Kenyon & Kenyon

[57] ABSTRACT

The radial bearing is constructed such that the lubricant passing from between the rotating shaft and the stationary bearing is drawn back into the rearmost terminal region of the groove between the bearing and shaft in order to eliminate cavitation. The connecting rod and bearing cap may be formed with an annular groove from which the lubricant is drawn back into the groove between the bearing and shaft or the outer periphery of the bearing can be provided with a groove from which the lubricant can be drawn. Also, the inner surface on the bearing can be provided with one more groove extensions to permit return of the lubricant to the rearmost region.

9 Claims, 5 Drawing Figures

RADIAL BEARING FOR AN INTERNAL COMBUSTION ENGINE

This invention relates to a radial bearing and, more particularly, to a radial bearing for an internal combusion engine.

As is known, internal combustion engines are generally constructed with a rotatable shaft which is mounted within a radial bearing housed within a connecting rod and bearing cap arrangement. Usually, the shaft is provided with an axial duct which communicates with a lubricant supply as well as with at least one radial duct which extends from the axial duct to the periphery of the shaft. In addition, the radial bearing is frequently provided with an internal groove aligned with the radial duct of the rotatable shaft so as to receive the lubricant and to expel the lubricant through one or more orifices in the bearing to a lubricant chamber located outside the bearing.

However, it has been found that radial bearings of the above kind are often damaged by cavitation and erosion in the region of the bearing surface grooves. This damage occurs mainly near one end of the groove if the engine always rotates in the same direction. This considerably reduces the operating life of the bearing.

Accordingly, it is an object of the invention to preclude damage by cavitation and erosion in the end regions of a bearing surface groove of a radial bearing for an internal combustion engine shaft.

It is another object of the invention to provide a radial bearing of extended operating life for use in an internal combustion engine.

Briefly, the invention provides a combination of a radial bearing and a shaft rotatably mounted in the radial bearing. The bearing is provided with a groove in an inner surface and at least one orifice which communicates the groove with a lubricant chamber outside the bearing. The shaft has an axial duct for communication with a lubricant supply and at least one radial duct which extends from the axial duct to a surface of the shaft within the radial bearing and circumferentially aligned with the groove in the bearing. In this construction, the ducts in the shaft, the groove in the radial bearing and the lubricant chamber define a lubricant flow path.

The invention proceeds from the surprising discovery that, as a shaft rotates, a vacuum arises in the terminal region of the bearing surface groove and causes cavitation and, therefore, damage to the radial bearing. In accordance with the invention, a vacuum is prevented from occurring in this region. To this end, a feed way is provided to communicate the lubricant flow path with the terminal region of the groove in the bearing. This terminal region is that which a point on the shaft initially passes over relative to the direction of rotation of the shaft. That is, the region is the rearmost terminal region of the groove relative to the direction of rotation of the shaft.

In one embodiment, the feed way communicates with the lubricant chamber located outside the bearing. In this embodiment, the feed way may be in the form of a duct which passes through the bearing and is of a diameter equal to the width of the bearing groove.

In another embodiment, the feed way may be in the form of a circumferential extension of the bearing groove.

In still another embodiment, the lubricant chamber may be in the form of a peripheral groove in the bearing which is of a length substantially equal to the length of the bearing groove in the inner surface of the bearing.

These and other objects and advantages of the invention will become more apparent from the following detailed description taken in conjunction with the drawings wherein.

Figure 1:
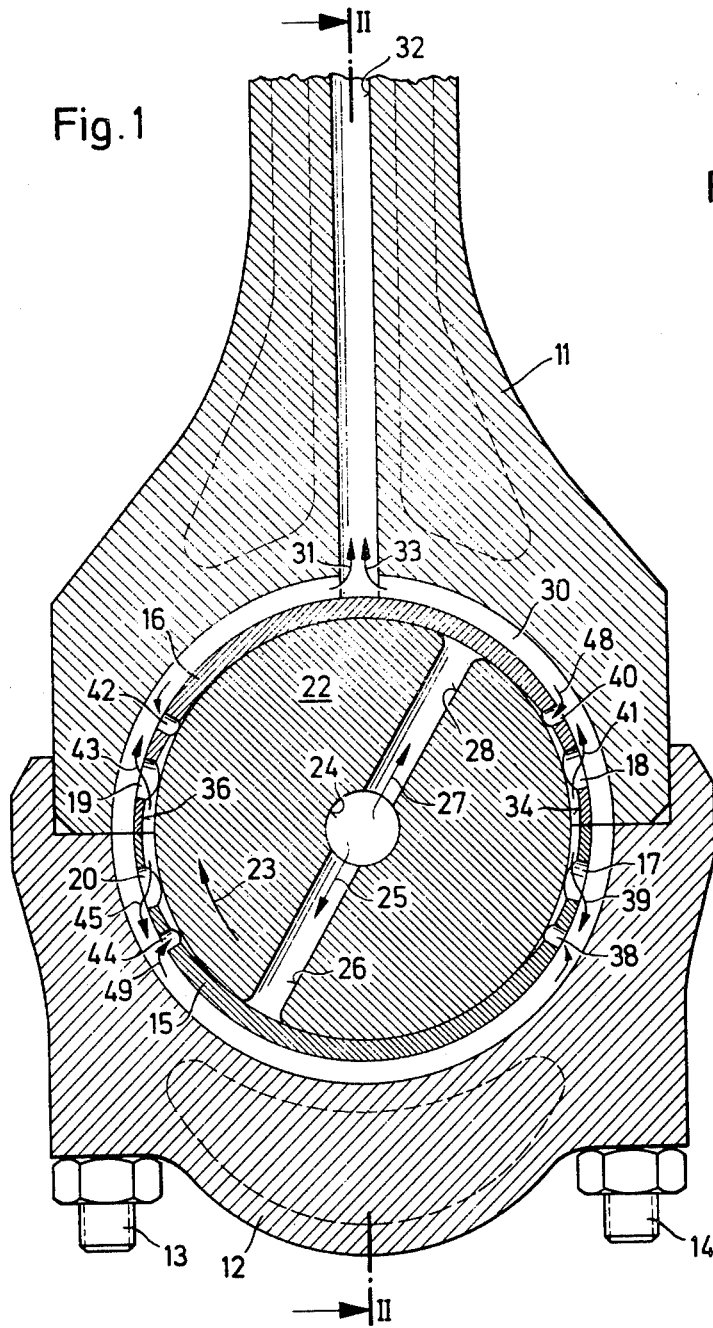
FIG. 1 illustrates a longitudinal sectional view through a large end bearing of a connecting rod 4 of an internal combustion engine in accordance with the invention.
Figure 2:
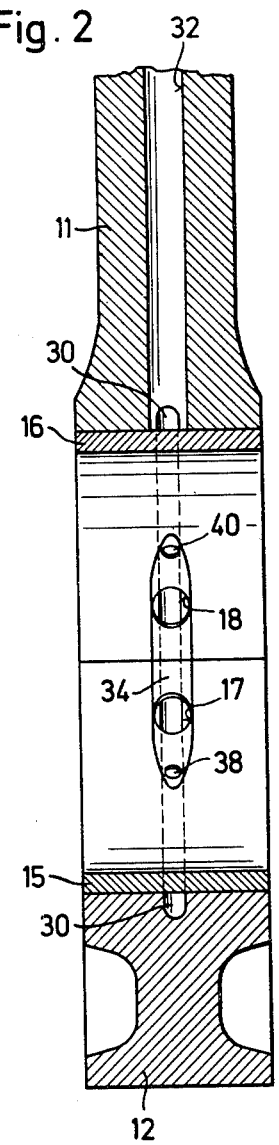
FIG. 2 illustrates a view taken on line II—II of FIG. 1.

Referring to FIG. 1, an internal combustion engine is provided with a connecting rod 11 and a bearing cap 12 which is secured to the rod 11 by screws 13, 14 in known manner. In addition, a radial bearing which is formed by a pair of semicircular shells 15, 16 is fitted between the surfaces of the rod 11 and bearing cap 12 (FIG. 2). In addition, a crank pin or shaft 22 is rotatably mounted within the radial bearing shells 15, 16. This crank shaft 22 has an axial duct 24 which communicates with a lubricant supply (not shown) and two radial ducts 26, 28 which extend from the axial duct to the surface of the shaft 22 within the radial bearing shells 15, 16.

The connecting rod 11 and the bearing cap 12 are constructed to form an annular groove 30 which is located outside the bearing shells 15, 16 and which communicates with a duct 32 in the connecting rod 11.

As shown in FIG. 1, the bearing shells 15, 16 are constructed to form inner grooves 34, 36 which are disposed on diametric portions of the bearing. Each of these grooves communicates via a pair of orifices 17, 18; 19, 20 in the respective shells 15, 16 with the annular groove 30. In this regard, the groove 30 forms a lubricant chamber outside the bearing to receive lubricant which passes from the axial duct 24, radial ducts 26, 28, grooves 34, 36 and ducts 17–20, depending upon the direction of rotation of the shaft 22.

In addition, the bearing shells 15, 16 are provided with orifices 38, 40; 42, 44 which are disposed in the terminal regions of the grooves 34, 36 and which function as feed ways for the lubricant.

Referring to FIG. 1, during operation, as the crank shaft 22 rotates, for example in the direction indicated by the arrow 23, lubricant enters the groove in a direction indicated by the arrows 25, 27, 39, 41, 43, 45 and leaves the groove 30 in the direction indicated by the arrows 31, 33 to enter the duct 32. During rotation in this direction, a suction effect is produced mainly near the ducts 40, 44. As a result, lubricant flows from the annular groove 30 in the direction indicated by the arrows 48, 49 into the ducts 40, 44 to reduce cavitation and erosion effects in the corresponding terminal regions of the grooves 34, 36. When the crank shaft of pin 22 runs in the opposite direction, the operation just described is taken over mainly by the ducts 38, 42.

Figure 3:
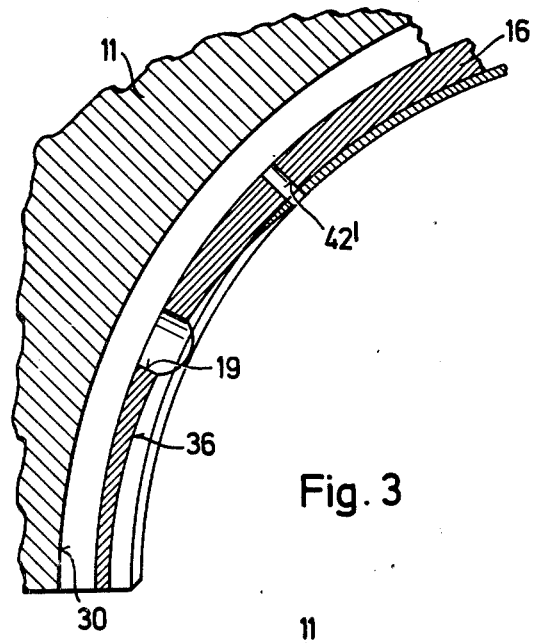
FIG. 3 illustrates a partial view of a modified radial bearing in accordance with the invention.

Referring to FIG. 3, wherein like reference characters indicate like parts as above, the feed ways, i.e. in the form of a duct 42', may be disposed substantially in the outermost terminal region of the groove 36. Conveniently, the groove 36 can be substantially semi-circular in cross section. As indicated in FIG. 3, a liner may be disposed within the bearing shells 16 which tapers to an edge within the groove 36.

The diameter of the ducts (feed ways) 38, 40, 42, 42', 44 corresponds substantially to the shape of the groove 34, 36 in the terminal region. Also, each of these feed ways 38, 40, 42, 42', 44 is of a cross-sectional area smaller than the cross-sectional area of the associated orifices 17-20.

Figure 4:
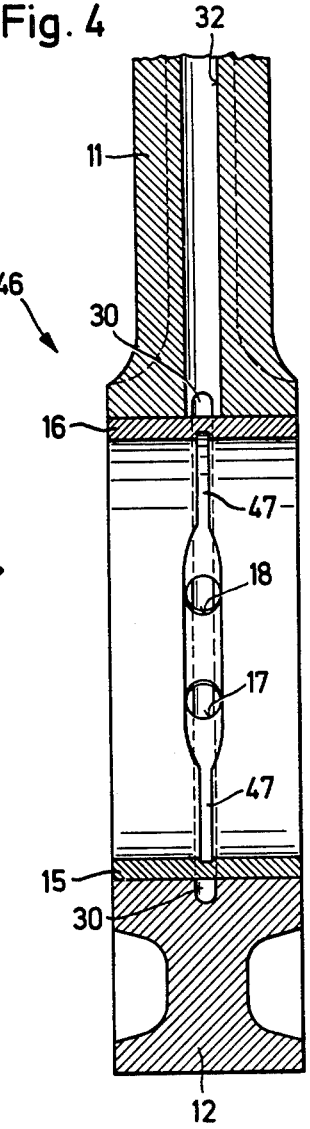
FIG. 4 illustrates a further modified radial bearing utilizing a groove extension as a feed way in accordance with the invention.

Referring to FIG. 4, wherein like reference characters indicate like parts as above, the feed ways may alternatively be constructed in the form of single annular groove extensions 47 instead of by ducts. In this embodiment, the groove extensions 47 communicate not with the annular groove 30 outside the bearing shells 15, 16 but receive lubricant directly from the ducts 26, 28 in the crank shaft 22.

Figure 5:
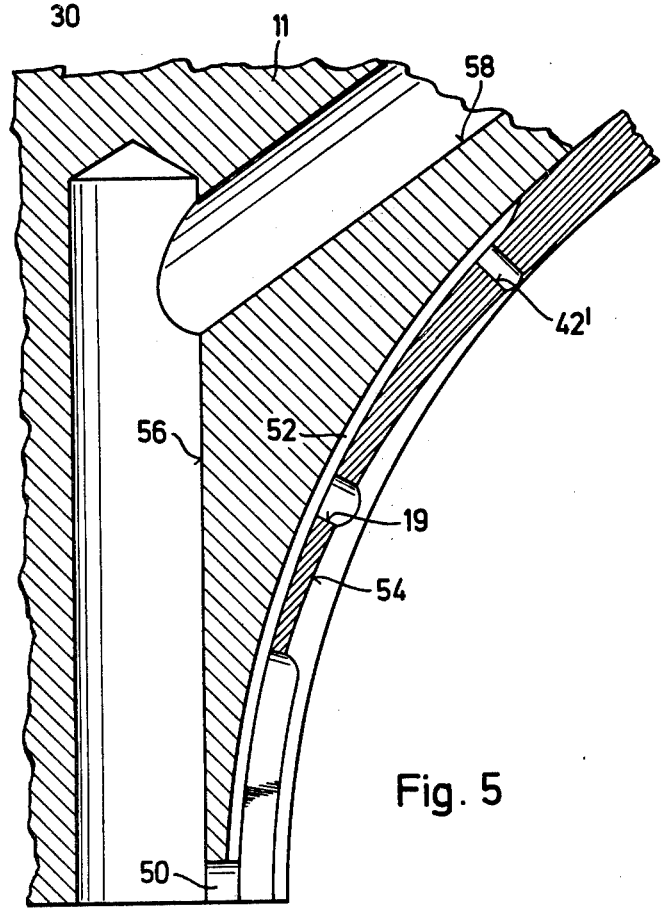
FIG. 5 illustrates a further modified view of a radial bearing according to the invention.

Referring to FIG. 5, wherein like reference characters indicate like parts as above, in order to increase the loading of the bearing part disposed in the connecting rod 11, the annular groove 30 of FIG. 1 may be eliminated. In this case, a peripheral groove 52 is located in the bearing shell 16 and extends over a length substantially equal to the length of the inner groove 54 in the inner surface of the bearing shell 16. These grooves 52, 54 communicate via a duct 50 in the connecting rod 11 with lubricant ducts 56, 58, also within the connecting rod 11. Further, instead of having the duct 42' communicate the rearmost terminal region of the groove 54 with the groove 52, the duct 42 may communicate the groove 54 directly with the duct 58 in the connecting rod 11. However, this would impair the strength of the connecting rod 11.

Finally, it is to be noted that the radial bearing may have a spindle or pivot or the like rotatable therein as is known.

The invention thus provides a radial bearing wherein lubricant can be returned from a lubricant chamber outside the radial bearing to a rearmost terminal region of an inner groove within the radial bearing relative to the direction of rotation of a shaft which rotates within the bearing. In this way, cavitation and erosion problems can be avoided.

What is claimed is:
1. In combination,
a radial bearing having a groove in an inner surface thereof and at least one orifice communicating said groove with a lubricant chamber outside said bearing;
a shaft rotatably mounted in said radial bearing, said shaft having an axial duct for communication with a lubricant supply and at least one radial duct extending from said axial duct to a surface of said shaft within said radial bearing and circumferentially aligned with said groove in said bearing whereby said axial duct, said radial duct, said groove and said lubricant chamber define a lubricant flow path; and
a feed way communicating said lubricant flow path with a terminal region of said groove which a point on said shaft initially passes over relative to the direction of rotation of said shaft, said feed way being of a cross-sectional area smaller than the cross-sectional area of said orifice.

2. The combination as set forth in claim 1 wherein said feed way communicates with said lubricant chamber outside said bearing.

3. The combination as set forth in claim 2 wherein said feed way is a duct of a diameter equal to the width of said groove.

4. The combination as set forth in claim 3 wherein said duct is disposed in the outermost terminal region of said groove.

5. The combination as set forth in claim 1 wherein said feed way is a circumferential extension of said groove.

6. In combination,
a connecting rod;
a bearing cap secured to said rod;
a radial bearing disposed between said rod and said bearing cap, said bearing having at least one groove in an inner surface thereof, and at least one orifice communicating said groove with an exterior surface of said bearing;
a lubricant chamber disposed between said bearing and at least one of said rod and said cap, said chamber being in communication with said orifice of said bearing;
a shaft rotatably mounted in said bearing, said shaft having an axial duct for communication with a lubricant supply and at least one radial duct extending from said axial duct to a surface of said shaft circumferentially aligned with said groove; and
a feed way communicating said lubricant chamber with a rearmost terminal region of said groove relative to the direction of rotation of said shaft, said feed way being of a cross-sectional area smaller than the cross-sectional area of said orifice.

7. The combination as set forth in claim 6 wherein said radial bearing includes a pair of semi-circular shells.

8. The combination as set forth in claim 6 wherein said lubricant chamber is an annular groove disposed in said rod and said cap.

9. The combination as set forth in claim 6 wherein said lubricant chamber is a peripheral groove in said bearing of a length substantially equal to the length of said groove in said inner surface of said bearing.

* * * * *